US 9,103,712 B2

(12) United States Patent
Schulzki et al.

(10) Patent No.: US 9,103,712 B2
(45) Date of Patent: Aug. 11, 2015

(54) HOUSING FOR A WEIGHING APPARATUS

(71) Applicant: Wipotec Wiege- und Positioniersysteme GmbH, Kaiserslautern (DE)

(72) Inventors: Alexander Schulzki, Stelzenberg (DE); Andreas Rübel, Olsbrücken (DE)

(73) Assignee: Wipotec Wiege- und Positioniersysteme GmbH, Kaiserslautern (DE)

( * ) Notice: Subject to any disclaimer, the term of this patent is extended or adjusted under 35 U.S.C. 154(b) by 0 days.

(21) Appl. No.: 14/289,470

(22) Filed: May 28, 2014

(65) Prior Publication Data

US 2014/0353050 A1    Dec. 4, 2014

(30) Foreign Application Priority Data

May 31, 2013    (DE) .......................... 10 2013 105 647

(51) Int. Cl.
    *G01G 21/28* (2006.01)
    *H05K 5/02* (2006.01)
    *G01G 21/30* (2006.01)

(52) U.S. Cl.
    CPC ................ *G01G 21/28* (2013.01); *G01G 21/30* (2013.01); *H05K 5/02* (2013.01)

(58) Field of Classification Search
    CPC ...................................................... H05K 5/02
    See application file for complete search history.

(56) References Cited

U.S. PATENT DOCUMENTS

| 4,416,343 | A  | 11/1983 | Knothe et al. |
| 8,055,456 | B2 | 11/2011 | Loher et al.  |
| 8,525,051 | B2 |  9/2013 | Hauck et al.  |

FOREIGN PATENT DOCUMENTS

| DE | 3208015 A1 | 12/1982 |  |
| DE | 102009013545 A1 | 9/2010 |  |
| DE | 2808660 A1 * | 12/2014 | ............. G01G 21/28 |
| EP | 2130007 B1 | 8/2012 |  |
| JP | 2002107219 A | 4/2002 |  |
| JP | 2012013465 A | 1/2012 |  |

OTHER PUBLICATIONS

German Patent Office Action of Feb. 4, 2014 in German Patent Application No. 10 2003 105 647.4 (5 pages).

(Continued)

*Primary Examiner* — Randy W Gibson
(74) *Attorney, Agent, or Firm* — The Culbertson Group, P.C.

(57) ABSTRACT

A housing for a weighing apparatus includes a bottom plate on which the weighing apparatus can be installed or which comprises part of the weighing apparatus. A surrounding elastic sealing element is located on the underside of the housing such that when the housing is placed in an installed position relative to a carrier element on which the weighing apparatus is connected, the bottom plate is sealed in an outside annular circumferential area of the underside of the bottom plate with respect to the surface of the carrier element. In the installed position, side walls of a housing upper part encompass the surrounding side wall of the bottom plate such that a lower front surface of the side walls impinges on an area of the sealing element which protrudes beyond the outside circumference of the bottom plate. This impingement seals the housing side walls with respect to the bottom plate.

12 Claims, 3 Drawing Sheets

(56) References Cited

OTHER PUBLICATIONS

EP Search Report for EP patent application EP 14401066.7 (citing JP2002107219A and JP2012013465 as category "X" references as to EP patent application EP 14401066.7 which is analogous to application DE 10 2013 105 647.4 from which priority is claimed in the present case).

* cited by examiner

HOUSING FOR A WEIGHING APPARATUS

TECHNICAL FIELD OF THE INVENTION

The invention concerns a housing for a weighing apparatus. More particularly, the invention is directed to a weighing apparatus housing which includes a sealing arrangement for sealing an upper portion of the housing to a bottom plate of the housing.

BACKGROUND OF THE INVENTION

Housings for weighing apparatuses are known in diverse forms. Known housings for weighing apparatuses frequently include a bottom plate, on which the weighing apparatus is located. The weighing apparatus can, for example, comprise a sensor, which works in accordance with the principle of the electromagnetic force compensation. Such force sensors usually have a Roberval mechanism, which is, if necessary, connected to one or more transmission levers. The load force to be detected acts on the movable part of the Roberval mechanism, which is connected to the first transmission lever. There is a coil at the end of the last lever; it is held at a constant height position in a magnetic field. To this end, the coil located on the last lever is impinged on with a current, which is regulated in such a way that with the currently acting load force, the predetermined height position of the last lever is maintained constant. Thus, the value of the current through the coil is a measure of the detected load force. All the components that are required for the detection of the load force, that is, the sensor, the control electronics, and perhaps a device for the processing of the detected measurement value(s), can be situated on the bottom plate of the housing. The housing usually includes a housing upper part which covers the upper side of the bottom plate for protection against environmental influences, such as, in particular, dust and moisture.

A carrier arm, on the one hand, and the contacts to emit the electrical or electronic measurement signals, on the other hand, must, however, be conducted out of the housing. The carrier arm is usually conducted out via an opening on the upper side or cover side of the housing. The opening is also sealed, with respect to environmental influences, by means of a sealing arrangement. In particular, labyrinth seals can be considered, wherein a first sealing part in the opening of the housing, or surrounding the opening, is located on the upper side of the housing. This first sealing part is penetrated by the carrier arm, if possible, in a non-contact manner. In this case, the carrier arm is connected to a second sealing part, which, together with the first sealing part, forms a labyrinth-like annular space in a vertical section. In this way, a contact-free sealing of the opening, without thereby resulting in a force shunt, is attained in the housing for the carrier arm.

Cable conduits or plug contacts for the transmission of the electrical measurement signals from the housing can be provided on the underside of the housing, that is, on the underside of the bottom plate.

Such units, including a housing and a weighing apparatus situated therein, are designated as weighing cells within the scope of this description.

Such weighing cells are frequently incorporated into complex weighing devices, for example, multitrack weighing apparatuses. To this end, the weighing cells are usually installed with their bottom plate on a machine frame of the complex weighing device.

For sealing weighing apparatus housings that include a bottom plate and a pot- or tub-shaped housing upper part, various methods are known. It is possible, for example, to weld, to cement, or to seal off tightly the two housing parts, as hermetically as possible, by sealing elements arranged between the housing parts. The sealing elements may include flat seals or round cord seals (O-rings) arranged between the housing upper part and the upper side of the base plate.

Such flat seals or round cord seals are acted on with a defined force during the installation of the weighing cell, that is, during the joining of the two housing parts, and are thereby deformed. Due to this deformation and due to the aging processes of the materials of the seals or due to wear and tear, for example, produced by contact with aggressive media, the sealing elements will frequently eventually lose their sealing effect. The actual condition of the sealing element, and thus of the sealing effect, can be seen only with difficulty when the housing parts have been installed, since the sealing elements are usually completely situated between the housing parts to be sealed. For example, the housing upper part with its side walls can encompass the outside of the bottom plate, and the sealing element can be provided between the inside of the side walls and the outside of the bottom plate. For sealing elements to engage laterally, the side walls of the housing upper part can be connected to the bottom plate, using laterally provided, horizontal screw connections. Alternatively, the side walls of the housing upper part in the lower part can also be bent laterally outward or inward and screwed to the bottom plate, from above or below, wherein the sealing element is provided between the bent wall part and the upper side of the bottom plate. Since the sealing element in these cases is not visible from the outside and thus its condition cannot be examined without dismantling the housing, a defective sealing effect is frequently not recognized and is determined only with the occurrence of functional damage to the weighing cell.

In order to avoid such damage to the weighing cell, it is possible, for example, to retighten the installation screws at certain predetermined chronological intervals, so as to again produce the original pressing force on the sealing element. Alternatively, of course, the sealing element can also be replaced at predetermined chronological intervals. To this end, however, an at least partial dismantling of the weighing cell is necessary, which should usually take place only at the manufacturing factory, so as to guarantee the required accuracy and reliability of the weighing cell.

For the inspection of the condition of a force measuring apparatus, EP 2 130 007 B1 describes a method in which the interior of the weighing cell is filled with a gas. To detect leakages, the state of the gas filling within the weighing cell housing is monitored. However, this is technically cumbersome and expensive.

In addition, in many cases, there is the problem of sealing the housing of the weighing cell with respect to a carrier element, for example, a machine frame. This is always sensible and necessary if the weighing cell has cable outlets through the bottom plate downward or plug contacts that lead out on the underside of the bottom plate for the conducting away of measurement signals or the delivery of control signals.

SUMMARY OF THE INVENTION

A goal of the invention is to provide a housing for a weighing apparatus in which the interior of the housing is simply sealed off between a bottom plate and a housing upper part, with long-term stability with respect to the carrier element.

A weighing apparatus housing in accordance with the invention has a bottom plate, on which the weighing apparatus can be installed or which is designed as a unit with the weighing apparatus or a component of the weighing apparatus. A continuous elastic sealing element is located on the underside of the housing. The sealing element is designed in such a way that a surrounding annular gap between the outside surrounding area of the underside of the bottom plate and the surface of the carrier element on which the weighing apparatus is mounted is sealed off when the housing has been installed on the carrier element surface with a defined pressing force that acts on the underside of the bottom plate and the upper side of the carrier element. Thus, cable conduits through the bottom plate into the machine frame or electrical contacts that are provided on the underside of the bottom plate are protected against environmental influences when the housing and carrier element have been installed.

The sealing element is designed in such a way that with the installation, it is elastically deformed by the impingement with the pressing force between the underside of the bottom plate and the surface of the carrier element. The sealing element is made of an elastic material, for example, an elastic plastic such as silicone. The elasticity of the material and the configuration of the sealing element can be coordinated with one another in such a way that a sufficient sealing effect is guaranteed. The material of the sealing element can be adapted to the application. For example, with applications in the food area, a material that has a corresponding suitability or approval by the competent authorities can be used.

Moreover, a magnetically and/or electrically conducting material can be used for the sealing element, so as to also make the sealing tight with respect to electromechanical rays and to guarantee the electromagnetic compatibility of the weighing apparatus provided in the housing or the weighing cell, including the housing and the weighing apparatus, at least when the housing and the carrier element are installed.

When the two housing parts, that is, the bottom plate and the upper part of the housing, have been installed, the upper part of the housing encompasses the bottom plate over its entire circumference with a surrounding side wall. When the housing has been installed on the carrier element, the lower front surface of the side wall impinges, with a defined pressing force, on an area of the sealing element that protrudes over the outside circumference of the bottom plate for the sealing of the side wall with respect to the bottom plate.

Thus, the use of the single sealing element guarantees both a sealing of the housing or the bottom plate with respect to the carrier element, as well as a sealing of the housing upper part with respect to the bottom plate, and thus a sealing of the interior of the housing.

Moreover, when the housing has been installed, there is a complete protection of the bottom plate from aggressive media, since the bottom plate is surrounded on all sides by the housing upper part and is completely sealed off with respect to the surroundings by the sealing element. In this way, the bottom plate can be made of the same material as the force sensor of the weighing apparatus, for example, aluminum, even if this material is sensitive with respect to environmental influences or with respect to aggressive media that are used or appear in certain applications. The advantage thereby resulting from this is that no thermal tensions can appear between the bottom plate and the force sensor as a result of different thermal expansion coefficients of the materials.

According to one preferred embodiment of the invention, the housing is designed in such a way that the housing or the weighing cell is exclusively installed on the carrier element by a mechanical connection of the bottom plate with the carrier element. This can occur preferably by means of a screw connection. The upper part of the housing can then likewise be connected to the bottom plate exclusively via a mechanical connection, for example, by screwing.

Thus, the housing or the complete weighing cell installed on the carrier element can be opened by dismantling the upper part of the housing without having to dismantle the weighing apparatus from the carrier element. The seal between the underside of the bottom plate and the upper side of the carrier element is thereby retained.

In one preferred embodiment of the invention, the sealing element is provided on the outside circumference of a carrier part, wherein the carrier part can be designed as a carrier plate. In this way, a sufficient mechanical stabilization of the sealing element results with respect to its form. In particular, the course of the annular sealing element is stabilized with respect to the desired form of the ring. The sealing element need not then be aligned according to the course of the circumference or the boundary area of the housing or the bottom plate during the installation of the housing on the machine frame or the carrier element, since the form of the sealing element is maintained in a stable manner with respect to the circumferential course by the carrier part. In any case, the housing must be aligned with respect to the combination or the module comprising the carrier part and sealing element if the module is not connected to the bottom plate.

The carrier part may be configured in such a way that it engages into the sealing element with a surrounding boundary area or with partial areas of the boundary area, with the sealing element provided on the carrier part in such a way that it protrudes through the bottom plate on both sides over the boundary area of the carrier part in the impingement direction.

Due to the engaging of the sealing element, there also results a stabilization of the cross section of the sealing element with respect to a vertical impingement of the sealing element with the pressing force that is exerted from the underside of the outside boundary area of the bottom plate and the lower front side of the side walls of the upper side of the housing on the upper side of the sealing element and from the surface of the carrier part on the underside of the sealing element. In this way, a relatively soft and highly elastic sealing material can be used, without the risk that the sealing element will be deformed during the installation to such an extent that the sealing effect is lost as a result of material distortions, for example, in that folds occur in the seal area.

Moreover, in this way, there is generally a stabilization of the sealing element with respect to transverse forces occurring during the installation of the housing on the carrier element or when installed. A mechanical creep of the sealing material is prevented.

In the boundary area or in the partial areas of the boundary area, the carrier part can have openings in which corresponding areas of the sealing element engage on the carrier part in order to fix the sealing element. In a separate production of the two individual parts, the fastening of the sealing element on the carrier part can take place by pushing the annular sealing element that has corresponding recesses (partial grooves) or a surrounding recess on the inside wall, with the recesses or the groove, onto the outside boundary of the carrier part.

According to one embodiment of the invention, it is also possible to first produce the carrier part, which is then injection molded on its outside circumference with the material of the sealing element. In this way, a firm connection results between the sealing element and the carrier part.

The carrier part is produced from a material that is sufficiently solid or rigid to guarantee a sufficient stabilization of the course of the annular sealing element. In particular, the carrier part can be produced from a metal plate or a metal sheet, for example, by means of a punching or laser cutting method. In this way, narrow tolerances can be maintained.

According to a preferred embodiment of the invention, the carrier part, with the sealing element situated thereon, is situated in such a way on the underside of the housing that with the installation of the upper part of the housing and bottom plate, a sufficient sealing of the side wall of the upper part of the housing with respect to the bottom plate is guaranteed, and thus, a sufficient sealing of the interior of the housing with respect to the surroundings, even without the presence of a pressing force between the housing and the carrier element.

For this purpose, the carrier part is designed in a sufficiently stiff manner that with the impingement of the sealing element by the lower front side of the side walls of the upper part of the housing, a sufficient sealing is possible. The carrier part must, to this end, be able to fix the sealing element in a vertical direction (relative to the underside of the bottom plate) in such a way that a sufficient pressing force is guaranteed between the sealing element and the front side of the side wall of the housing upper part.

The carrier part is connected mechanically, preferably in a detachable manner, to the underside of the bottom plate, for example, by means of screwing, for the production of the required sealing forces between the front side of the side wall and the sealing element.

According to another embodiment of the invention, the carrier part has one or more openings, which are penetrated by flange projections, formed on the underside of the bottom plate, wherein the flange projections have placement surfaces, which lie on the carrier element when the housing has been installed. With reference to the flange projections, the sealing element is thereby dimensioned in such a way (that is, the configuration and the material are selected in such a manner) that when the housing has been installed on the carrier element, it exhibits an elastic deformation that guarantees the sealing function.

The flange projections thus guarantee an exactly defined annular gap between the underside of the housing and the surface of the carrier element in that area in which the sealing element carries out the sealing function. The flange projections and the sealing element are coordinated with one another in such a way that when the housing and the carrier element have been firmly installed, a defined deformation is produced. Thus, an overloading of the sealing element during the installation due to inadmissibly high pressing forces can be avoided. The flange projection or projections thus guarantee(s) an essentially constant, defined pressing force that acts on the sealing element independently of an installing force with which the housing is connected to the carrier element (as long as the flange lies on the upper side of the carrier element).

According to one preferred form of the invention, the bottom plate, the sealing element, and the carrier part are designed in such a manner and arranged on the underside of the housing in such a way that the housing lies exclusively by means of the sealing element on a flat surface when the upper part of the housing and bottom plate have been installed, as long as the housing is not impinged on with an additional pressing force in the direction of the flat surface.

The connection of the module comprising the sealing element and the carrier part to the bottom plate makes it possible to avoid, on the one hand, the loss of the sealing element. On the other hand, it is possible for the already installed housing or the weighing cell to be protected against damage when it is set down hard on a base, until its final installation on the carrier element during the handling required until then. The situation is such that the sealing element protrudes beyond the underside of the housing or the bottom plate, so that when setting down the housing or the weighing cell on a base, it is set down on an elastic material. Damage to the underside of the housing, for example, due to scratching, is thus avoided. At the same time, impacts are cushioned during the placement of the housing or the weighing cell on a base, wherein the danger of damage to the sensors, which are sensitive with respect to mechanical impacts, is reduced.

According to one form of the invention, the side wall of the housing upper part protrudes, with its front side impinging on the sealing element, beyond the underside of the boundary area of the bottom plate, which impinges on the sealing element. In this way, a secure sealing effect is attained, in particular, if the housing is not yet installed on the carrier element, and the underside of the sealing element is pressed against the front side of the side wall by the surface of the carrier element. In this way, the cross section of the sealing element can be simply designed and, in particular, have an essentially flat surface, on which lie the underside of the boundary area of the bottom plate and the front side of the side wall of the housing upper part.

According to a further form of the invention, a frame can be connected to the bottom plate for the installation of the housing upper part or can be designed as a unit with it. The housing upper part can be connected or coupled to the frame in this case in such a way that a pressing force sufficient for the sealing effect can be produced for the pressing of the front side of the side wall of the housing upper part against the sealing element.

In this way, a relatively thin-walled material can be used for the housing upper part. The required stability of the housing is attained by the additional frame when the installation has taken place.

The bottom plate can have one or more openings and/or one or more electrical contacts—preferably, plug contacts—which can be contacted via the underside of the bottom plate within the boundary area that is sealed off with respect to the carrier element (that is, in an area of the underside of the bottom plate, which is surrounded by the sealing element) when the housing has been installed on the carrier element.

The housing also guarantees thereby a sealing of the openings that, for example, are provided for cable conduits, or a protection of the electrical contacts, by the additional sealing of the housing with respect to the carrier element when incorporated, which is additionally used in comparison to known housings.

These and other advantages and features of the invention will be apparent from the following description of illustrative embodiments, considered along with the accompanying drawings.

BRIEF DESCRIPTION OF THE DRAWINGS

The invention is explained in more detail below, with the aid of an embodiment example, shown in the drawings in which.

DESCRIPTION OF ILLUSTRATIVE EMBODIMENTS

Figure 1:
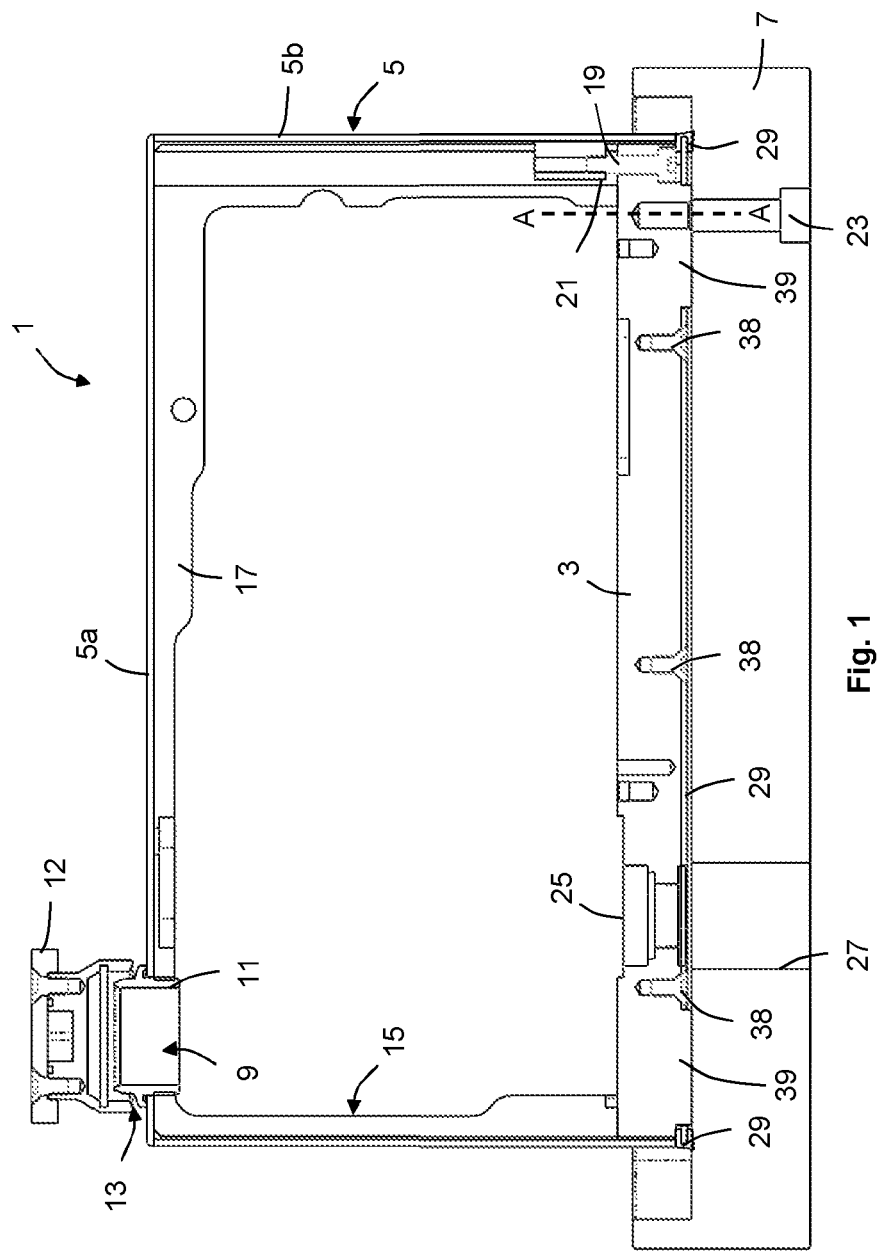
FIG. 1 is a section through the vertical, longitudinal middle plane through a housing for a weighing apparatus, in an installed position on a carrier element according to the invention.

The housing 1, shown in a sectional side view, for a weighing apparatus, which is not shown in more detail, includes a bottom plate 3 and a housing upper part 5, which is connected to the bottom plate 3 and which has a cover wall 5a and a surrounding side wall 5b. The housing upper part 5 thus has an essentially pot-shaped or tub-shaped form. It is thereby, of course, not necessary for the housing 1 or the housing upper part 5 to have an essentially rectangular-shaped form, as is shown in FIG. 1. The bottom plate 3 need not have an essentially flat structure either, but rather can be adapted to the structure of a carrier element 7 on which the housing 1 is to be installed. The carrier element 7 can, for example, be a part of a machine frame of a complex apparatus, such as a multitrack weighing apparatus.

Components of a weighing apparatus, not shown in the drawing in more detail, can be arranged on the bottom plate 3, for example, an electromechanical force sensor for the detection of a load force and other mechanical or electrical or electronic components that are intended for the conversion of the load force into an electrical signal. The electrical signal can be an analog signal or a signal that includes digital measurement values.

The bottom plate 3 can also be designed as an integral part of a component of the weighing apparatus, in particular, as a component of the electromechanical force sensor, which, for example, can work according to the principle of the electromagnetic force compensation.

The housing 1 is thereby used for the purpose of protecting the components of the weighing apparatus present in the interior of the housing against environmental influences, in particular, dust, dirt, and moisture.

A load arm of the weighing apparatus or the force sensor of the weighing apparatus (not shown in the figures) must, of course, be conducted out of the interior of the housing 1. This takes place via an opening 9, which is formed in the cover wall 5a of the housing upper part 5 in the embodiment of the housing 1 shown in FIG. 1.

A first labyrinth seal part 11 is inserted into the opening 9; its upper area interacts with the lower area of a second labyrinth seal part 12, which can be fastened on the load arm of the force sensor. With its lower area, the second labyrinth seal part 12 encompasses the upper area of the first labyrinth seal part 11 in a non-contact manner so as to avoid a force shunt with the introduction of the load force to be detected. Between the lower area of the second labyrinth seal part and the upper area of the first labyrinth seal part, therefore, a labyrinth-like annular space 13 is created in the cross section, which prevents or at least reduces the introduction of dust, dirt, or excessive air humidity in the form of droplets, etc., into the interior of the housing.

It should be mentioned at this point that the load arm can also be conducted out on the side wall of the housing upper part. A weighing apparatus with several load arms can also be located in the housing; it can be conducted outward via one or more openings in the housing. The one load arm or the several load arms can also be conducted outward via the bottom plate 3.

A frame 15, which can include several struts or ribs 17, is located on the bottom plate 3 for fastening and stabilizing the housing upper part 5. For example, a strut 17 can be provided on every longitudinal side of the bottom plate 3. In addition, of course, one or more struts can also be provided between the two outside struts 17. The longitudinally running struts 17 can thereby be connected by other transverse struts (not shown).

As can be seen from FIG. 1, the housing upper part 5 is set on the frame 15, overlapping it. The housing upper part can be connected to the frame by a screw connection via one or more screws that penetrate the housing upper part and engage in a strut 17.

In addition or instead, the first labyrinth seal part 11 can be simultaneously used as an installation part for the affixing of the housing upper part 5 on the frame 15. To this end, as shown in FIG. 1, the lower area of the first, essentially cylindrical, labyrinth seal part 11 can have a thread that engages in a complementary thread in the frame or in the pertinent strut 17. In this way, the housing upper part 5 is pressed, with its cover wall 5a, against the upper side of the pertinent strut. Thus, the housing upper part 5 experiences a vertically acting pressing force.

The frame 15 or the struts 17 can be connected to the bottom plate 3 by a screw connection. FIG. 1 shows, for the purpose of example only, a single screw connection, wherein a screw 19 penetrates the bottom plate 3 from below and engages in a vertical part of a correlated strut 17 that, for this purpose, has a borehole 21 with an inside thread.

For the fastening of the housing 1 on the carrier element 7, a screw connection can also be provided. Only one single screw 23 is likewise shown from this connection in FIG. 1; it penetrates the carrier element 7 from below and engages in a winding borehole in the lower side of the bottom plate 3.

Moreover, the bottom plate 3 shown in FIG. 1 has a plug connection 25, which is also shown only schematically. The plug connection 25 has contacts that are not shown in more detail; they are contactable by means of a plug and are accessible by means of a corresponding access opening 27 that is formed in the carrier element 7. The contacting itself can, of course, take place by means of a plug or other suitable means.

The bottom plate 3 can also have an opening through which corresponding electrical conduits can be led into the interior of the housing, instead of the plug connection 25 or in addition to the plug connection 25.

By means of the electrical contacts or by means of the conduits conducted through the opening, it is possible to transmit the measurement signals detected and perhaps processed by the force sensor, from the weighing cell, which is formed by the housing 1 and the weighing apparatus held therein, to another unit, for example, a higher-level processing unit. At the same time, of course, it is possible in this way to also transmit communication signals from the higher-level unit to the measuring cell and vice versa. Naturally, the supply of energy to the weighing apparatus can also take place in this manner.

In order to seal off the interior of the housing 1 and also the housing 1 with respect to the carrier element 7, a sealing element 29 is provided, which is arranged so it surrounds the lower outside edge of the bottom plate 3. This annular sealing element 29 comprises a sufficiently flexible, elastic sealing material, for example, a plastic such as silicone.

The annular sealing element 29 is arranged between the underside of the housing upper part 5 and the upper side of the bottom plate 3, so as to produce only a sealing effect between these two elements. Rather, the annular sealing element 29, as can be seen from FIG. 4, which shows an enlarged partial section along the A-A plane in FIG. 1, is located below the outside boundary area of the bottom plate 3 and is also used for the sealing of a space within the annular sealing element 29 and below the underside of the bottom plate 3 with respect to the surface of the carrier element 7. Thus, the plug connection 25 (shown in FIG. 1) or an opening to conduct through electrical conduits in the bottom plate 3 is sealed off with respect to the surroundings (above the carrier element 7). This is, of course, also true for all other components of the housing 1 or of the weighing apparatus held therein, to protect them against environmental influences; these components and weighing apparatus are provided on the underside of the bottom plate 3 within the annular sealing element 29 or are accessible via this outside surface of the housing.

Figure 4:
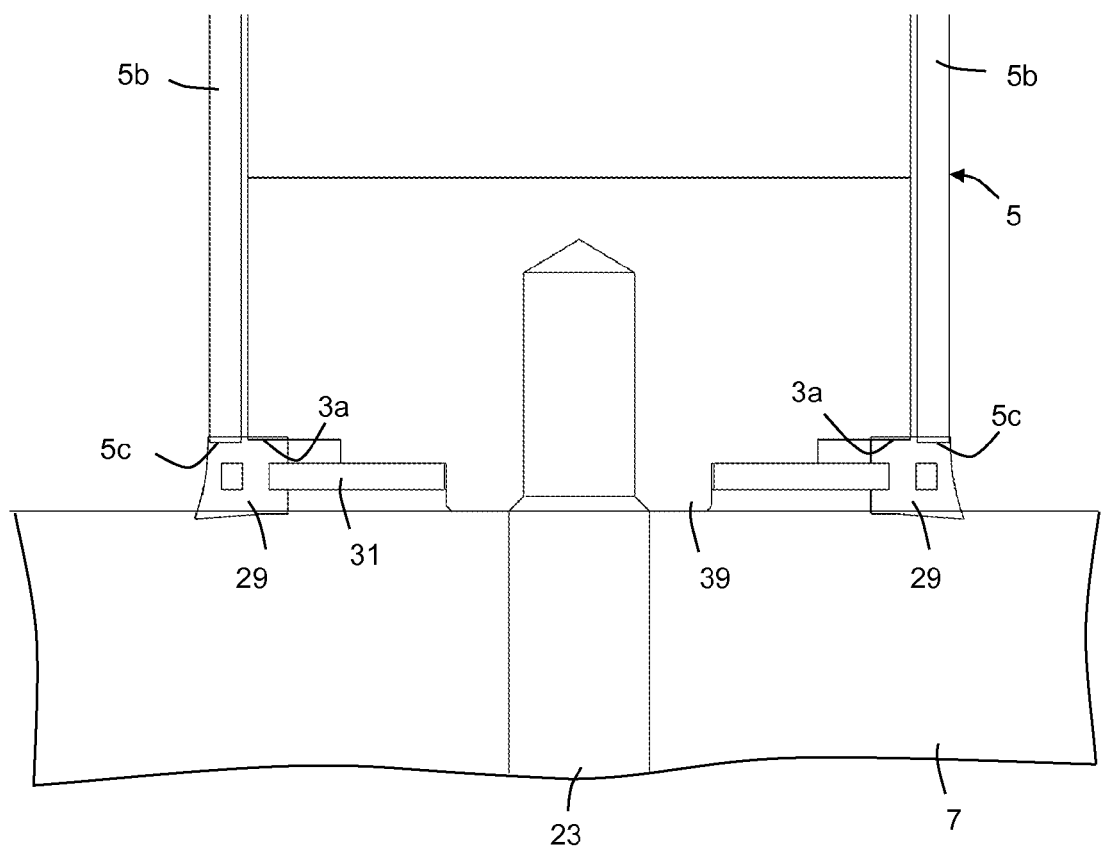
FIG. 4 is a section along the A-A plane through the weighing apparatus in FIG. 1.

As can be seen from FIG. 4, the surrounding sealing element 29 is designed in such a way that with its cross section, it protrudes beyond the outside circumference, that is, the outside of the bottom plate 3, running essentially vertically so that the lower surrounding front side 5c of the side wall 5b also impinges on the upper side of the surrounding sealing element 29 when the housing 1 is mounted on the carrier element 7. The pressing force of the front side 5c of the side wall 5b is thereby dependent, among other things, on the configuration and the material of the sealing element 29 and the configuration of the side wall 5b.

If, as with the embodiment in FIG. 4, a sealing element 29 is used with a cross section whose upper side is essentially flat and runs horizontally, then the side wall 5b is preferably designed in such a way that the lower front side 5c projects beyond the underside 3a of the bottom plate 3 in the outside boundary area of the bottom plate 3. This can ensure that a pressing force that is sufficient to guarantee the seal is also produced in the area of the impingement surface of the front side 5c of the sealing element 29 by the sealing element 29, even if the underside 3a of the bottom plate 3 impinges on the inside part of the horizontal upper side of the annular sealing element 29 and, in this way, the sealing element already experiences a partial deformation or compression in the area of the impingement surface of the front side 5c.

Thus, a secure sealing of the bottom plate 3 is attained with respect to the carrier element 7, and moreover, a secure sealing of the housing upper part 5 with respect to the bottom plate 3, and thus, a secure sealing of the interior of the housing 1 with respect to the surroundings.

As shown in FIG. 4, the cross section of the sealing element 29 can have a lower lip, so as to promote the sealing effect by a sufficient flexibility in the area of the lips. FIG. 4 thereby shows the sealing element in the uncompressed state or the state deformed by the pressing force, although the figure shows the installed state of the housing 1 and the carrier element 7.

The sealing element can also have a cross section that is symmetrical relative to the middle plane defined by the carrier part 31, for example, with flat, parallel upper sides and undersides. In this way, the sealing element 29 or the module made up of the carrier part 31 and the sealing element 29 can also be used rotated by 180°. Installation errors can thus be avoided.

As can be seen from FIGS. 1-4, the annular sealing element 29 is stabilized by means of a sufficiently rigid, for example, plate-shaped, carrier part 31, with respect to its desired annular shape, which essentially corresponds to the shape of the circumference of the bottom plate 3 or is coordinated with it. Without the stabilization by means of the carrier plate 31, the sealing element 29 would have to be aligned manually with respect to the course of the annular shape during the installation. The installation operation would accordingly be expensive and cumbersome.

Figure 2:
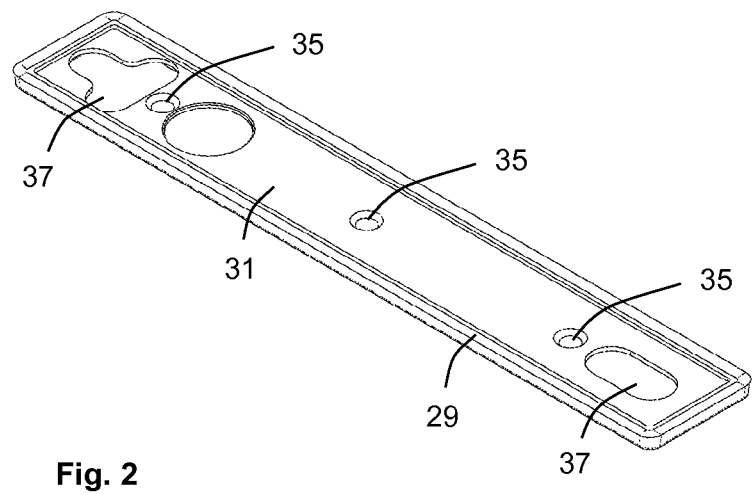
FIG. 2 is a perspective representation of the carrier part with the surrounding sealing element in FIG. 1.
Figure 3:
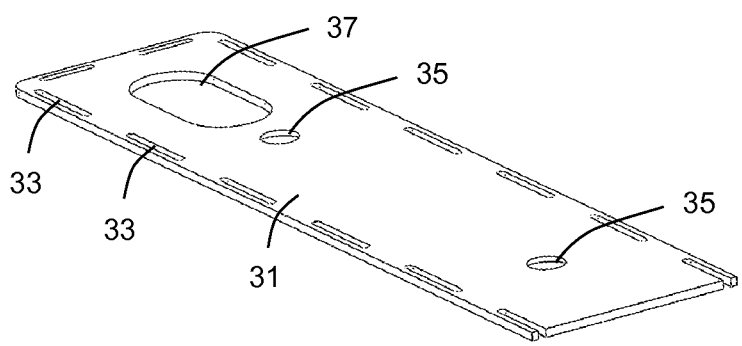
FIG. 3 is a perspective representation of a part of the carrier part of the arrangement in FIG. 2.

The carrier part 31 shown in FIGS. 2 and 3 (FIG. 3 shows the section of the carrier part 31 depicted to the right in FIG. 2, in a view rotated by 180 degrees around a vertical axis), is essentially designed in the shape of a plate, wherein the plate-shaped carrier part 31 has several central openings 35, 37 and several openings 33 along the boundary area. Such a plate-shaped design of the carrier part 31, however, is not absolutely required to attain a stabilizing of the sealing element 29. For this purpose, a frame-like, sufficiently rigid carrier part 31 would also perhaps be sufficient.

As can be seen from FIG. 2, the annular sealing element 29 surrounds the carrier part 31 on its circumference. The carrier part 31 thereby engages, with its outside boundary, with the radial, inside area of the flexible sealing element 29, as can be seen also from FIG. 4. In this way, the sealing element 29 also experiences a stabilization with an impingement with a pressing force in the vertical direction as it is produced during installation and when the housing 1 has been installed on the carrier element 7. A mechanical creep during the installation or when the installation has taken place—that is, during the operation of the weighing apparatus—is thus avoided.

The openings 33 in the outside boundary area of the carrier part 31, which can be seen in FIG. 3 and in the section in FIG. 4, are used to affix the sealing element 29 securely on the carrier part. To this end, the sealing element can be sprayed on the outside boundary area of the carrier part 31 or the boundary area of the carrier part 31, or can be injection-molded with the material of the sealing element 29. Thus, a nondestructive, detachable connection between the sealing element 29 and the carrier part 31 is produced. Of course, the sealing element 29 can, however, be produced separately and, can have a surrounding groove on its inside, on whose inside side walls projections are provided that penetrate the openings 33 of the carrier part 31.

The carrier part 31 can be connected together with the sealing element 29 to the underside of the bottom plate 3 in a detachable manner. To this end, the carrier part 31 can have the central openings 35. The carrier part 31 can thus be connected by screws 38 (see FIG. 1) to the underside of the bottom plate 3.

The result is the advantage that the installed housing 1 with the weighing apparatus held therein, including the sealing element 29 or the module made up of the sealing element 29 and the carrier part 31, can be pre-installed. In this pre-installed state, the interior of the housing is already sealed, since the sealing element 29 impinges with its upper side on the underside 3a of the outside boundary area of the bottom plate 3 and the lower front side 5c of the surrounding housing wall 5b of the housing upper part 5.

Of course, it is thereby necessary for the sealing element 29 and the carrier part 31 to be coordinated with reference to the underside of the bottom plate 3 in such a way that when the housing has been installed, a sufficiently high pressing force is produced between the sealing element 29 and the underside 3a or the front side 5c. To this end, the carrier part 31 must be designed to be sufficiently rigid to avoid that the carrier part 31—as a result of the pressing force acting on the sealing element 29—is deformed, elastically or plastically in such a manner that there is a reduction of the pressing force. In other words, the carrier part must be rigid enough that its surrounding boundary area is not bent downward, together with the sealing element 29 located on it (that is, away from the underside of the bottom plate 3).

The sealing element 29 and the underside of the bottom plate 3 are preferably designed in such a manner that the underside of the sealing element 29 protrudes beyond the underside of the bottom plate 3 in such a way that the housing lies exclusively on the underside of the sealing element 29 when the housing including the pre-installed sealing element is placed on a flat base. In this way, damage to the underside of the housing, for example, scratching, is avoided. In addition, when the housing pre-installed weighing cell is set down on a base, impacts are diminished, so that the risk of damage to the mechanically sensitive parts of the weighing cell is reduced.

During the installation of the housing 1 on the carrier element 7, which, for example, can be a part of a machine frame, the sealing element 29 is also impinged on with a vertically acting pressing force, which, for example, can be produced by the screw connection (screw 23) shown in FIGS. 1 and 4. In this way, the pressing force between the upper side of the sealing element 29 and the undersides 3a, 5c of the surrounding side wall 5b or the outside area of the bottom plate 3, is, on the one hand, increased. On the other hand, a sufficient pressing force between the underside of the sealing element 29 and the placement area on the carrier element 7 is produced, so that the space beneath the underside of the bottom plate 3 and within the annular sealing element 29 is sealed off.

The bottom plate 3 can have flange projections 39 to produce a defined pressing force; they penetrate the carrier part 31 in the openings 37. In this case, the thread boreholes for one or more screws 23 for the installation of the housing 1 on the carrier element 7 are preferably provided on the underside of the flange projections 39, as is shown in FIGS. 1 and 4.

Since, in the non-installed state of the housing 1 on the carrier element 7, the sealing element 29 protrudes in the vertical direction downward beyond the underside of the bottom plate 3, a corresponding sealing effect is produced when the screws 23 are tightened. The flange projections 39 and the cross section of the sealing element 29 are thereby preferably coordinated with one another in such a way that with the installation of the housing 1 on the carrier element 7, the screw connection can be firmly tightened until the flange projections 39 lie on the surface of the carrier element 7. If, after the first lying of the flange projections 39 on the carrier element 7, the installation force is increased by an additional tightening of the screws 23, the pressing force between the undersides 5c and 3a of the housing 1 and the upper side of the carrier element 7, nevertheless, remains constant. Thus, an overloading of the sealing element 29 can be avoided and the installation can be clearly simplified.

The flange projection(s) 39 can also additionally be used for the purpose of guaranteeing an exact positioning of the carrier part 31, together with the sealing element 29, on the underside of the bottom plate 3 or the housing 1. To this end, the openings 37 in the carrier part 1 can have a suitable configuration, which, in connection with the configuration of the side walls of the flange projections 39, guarantees an exact positioning of the carrier part 31 or the sealing element 29 connected to it in the horizontal plane or the plane of the underside of the bottom plate 3. For example, the form of the openings 37 can correspond to the form of the outside circumference of the flange projections 39.

Thus, the housing 1 offers the advantage of an extremely simple and effective sealing, guaranteed when installed, both for the housing 1 with respect to the carrier element 7, and also for the housing 1 itself (or the housing upper part 5 with respect to the bottom plate 3).

The housing upper part 5 can be dismantled without having to dismantle the rest of the housing, including the weighing apparatus held therein, from the carrier element 7. Maintenance work on the weighing apparatus in the interior of the housing 1 can thus be carried out in a simple manner.

Moreover, the sealing element 29, together with the carrier part 31, can be simply replaced. To this end, it is not necessary to open the housing 1.

The sealing element 29 can be seen from the outside, so that the state of the sealing element can be simply subjected to a visual inspection.

For various uses of one and the same weighing cell, different sealing elements can be used, which differ, for example, in material and cross-sectional configuration. The different elements can also be located on different carrier parts, which also differ with respect to the material and the configuration (for example, with regard to the thickness of a plate-shaped material). The sealing element 29 can thereby have one characteristic color, for example, a color that indicates that the sealing element or the combination of the sealing element and carrier part is provided and suitable for use in the food industry.

The module-like combination of the sealing element and carrier part leads, moreover, to the advantage that neither in the housing nor in the carrier element is it necessary to introduce one or more recesses, for example, grooves, so as to avoid a stabilization of the sealing element with respect to a mechanical creep, as a result of the sealing forces.

As used herein, whether in the above description or the following claims, the terms "comprising," "including," "carrying," "having," "containing," "involving," and the like are to be understood to be open-ended, that is, to mean including but not limited to. Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described preferred embodiments are intended to illustrate the principles of the invention, but not to limit the scope of the invention. Various other embodiments and modifications to these preferred embodiments may be made by those skilled in the art without departing from the scope of the present invention.

LIST OF REFERENCE SYMBOLS

1 Housing
3 Bottom plate
3a Underside
5 Housing upper part
5a Cover wall
5b Side wall
5c Lower front side
7 Carrier element
9 Opening
11 First labyrinth seal part
12 Second labyrinth seal part
13 Annular space
15 Frame
17 Strut
19 Screw
21 Borehole
23 Screw
25 Plug connection
27 Access opening
29 Sealing element
31 Carrier part
35 Opening
37 Opening
38 Screw
39 Flange projection

The invention claimed is:

1. A housing for a weighing apparatus which is adapted to be connected to a carrier element, the housing including:
   (a) a bottom plate which is either integral with the weighing apparatus or is adapted to receive one or more components of the weighing apparatus, the bottom plate including a peripheral side wall;
   (b) an elastic sealing element located on an underside of the housing including in an annular peripheral area of an underside of the bottom plate, the elastic sealing element also including a peripheral protruding area which protrudes laterally from the bottom plate beyond the bottom plate peripheral side wall;
   (c) a housing upper part having an upper part cover wall and an upper part side wall; and
   (d) wherein when the bottom plate and housing upper part are placed in an installed position on a surface of the carrier element (i) the upper part side wall encompasses the bottom plate peripheral side wall and impinges on the peripheral protruding area of the elastic sealing element so as to form a seal between the upper part side wall and the bottom plate, and (ii) the underside of the housing in the annular peripheral area of the bottom plate presses the elastic sealing element against the surface of the carrier element to form a seal between the bottom plate and the carrier element.

2. The housing of claim 1 further including:
   (a) a mechanical connector on the bottom plate for connecting the housing to the carrier element; and
   (b) a mechanical connection between the housing upper part and the bottom plate.

3. The housing of claim 1 further including a carrier part and wherein the elastic sealing element is positioned at a peripheral boundary area of the carrier part.

4. The housing of claim 3 wherein:
   (a) at least part of the carrier part peripheral boundary area engages the elastic sealing element; and
   (b) the carrier part defines an upper plane and a lower plane in the peripheral boundary area and the elastic sealing element positioned at the peripheral boundary area of the carrier part protrudes both above the upper plane and below the lower plane in the direction in which the upper part side wall impinges the elastic sealing element when the housing is in the installed position on the surface of the carrier element.

5. The housing of claim 3 wherein the peripheral boundary area of the carrier part includes boundary area openings into which corresponding areas of the elastic sealing element extend to affix the elastic sealing element on the carrier part.

6. The housing of claim 3 wherein the elastic sealing element is made of an elastic plastic and is produced by injection-molding on the carrier part.

7. The housing of claim 3 wherein when the housing upper part is placed in a connected position with the bottom plate and the carrier part is connected to the underside of the bottom plate, the upper part side wall impinges on the peripheral protruding area of the elastic sealing element so as to form a seal between the upper part side wall and the bottom plate independent of the position of the housing relative to the carrier element.

8. The housing of claim 3 wherein:
   (a) the carrier part includes at least one flange receiving opening which is penetrated by a respective flange projection formed on the underside of the bottom plate; and
   (b) wherein the respective flange projection has placement surfaces that lie on the carrier element when the bottom plate is in the installed position on the carrier element, the placement surfaces being located relative to the elastic sealing element so as to ensure an elastic deformation of the elastic sealing element to provide the seal between the bottom plate and the carrier element.

9. The housing of claim 1 wherein when the bottom plate and housing upper part are placed in the installed position on the surface of the carrier element, the only portion of the housing which contacts the surface of the carrier element is the elastic sealing element.

10. The housing of claim 1 wherein when the housing upper part is placed in a connected position with the bottom plate, a front side surface of the upper part side wall protrudes beyond the underside of the housing in the annular peripheral area of the bottom plate to impinge on the elastic sealing element.

11. The housing of claim 1 further including a frame connected to the bottom plate and wherein the housing upper part is adapted to connect to the frame such that connecting the housing upper part to the frame presses a front side surface of the upper part side wall against a surface of the elastic sealing element to form the seal between the upper part side wall and the bottom plate.

12. The housing of claim 1 wherein the bottom plate includes at least one conduit opening or at least one underside electrical contact within an area of the bottom plate bounded by the annular peripheral area.

* * * * *